United States Patent [19]
Råbe

[11] Patent Number: 5,793,148
[45] Date of Patent: Aug. 11, 1998

[54] ARRANGEMENT IN A DRIVE UNIT FOR AN ULTRASOUND SEALING UNIT

[75] Inventor: Magnus Råbe, Lund, Sweden

[73] Assignee: Tetra Laval Holdings & Finance S.A., Pully, Switzerland

[21] Appl. No.: 665,898

[22] Filed: Jun. 19, 1996

[30] Foreign Application Priority Data

Jun. 19, 1996 [SE] Sweden ................. 9502225

[51] Int. Cl.$^6$ ............... H01L 41/08; B65B 51/22
[52] U.S. Cl. ............................................. 310/328
[58] Field of Search ............................. 310/323, 328

[56] References Cited

U.S. PATENT DOCUMENTS

| | | | |
|---|---|---|---|
| 3,175,406 | 3/1965 | Eisner | 74/155 |
| 3,184,842 | 5/1965 | Maropis | 29/470 |
| 3,368,085 | 2/1968 | McMaster et al. | 310/325 |
| 3,524,085 | 8/1970 | Shoh | 310/325 |
| 3,671,366 | 6/1972 | Miller | 156/380 |
| 3,772,538 | 11/1973 | Supitilov | 310/323 |
| 4,074,152 | 2/1978 | Asai et al. | 310/323 |
| 4,363,992 | 12/1982 | Holze, Jr. | 310/323 |
| 4,483,571 | 11/1984 | Mishiro et al. | 310/323 |
| 4,607,185 | 8/1986 | Elbert et al. | 310/323 |
| 4,651,043 | 3/1987 | Harris et al. | 310/323 |
| 4,652,785 | 3/1987 | Gabriel et al. | 310/325 |
| 4,995,938 | 2/1991 | Tsutsumi | 156/580.1 |
| 5,057,182 | 10/1991 | Wuchinich | 156/580.1 |
| 5,508,580 | 4/1996 | Maeno et al. | 310/323 |

FOREIGN PATENT DOCUMENTS

| | | | |
|---|---|---|---|
| 0 496 694 | 7/1992 | European Pat. Off. | B29C 65/08 |
| 0 615 907 | 9/1994 | European Pat. Off. | B56B 51/22 |
| 34 25 583 | 4/1985 | Germany | H04R 1/06 |
| 35 42 741 | 12/1988 | Germany | B06B 1/06 |
| 40 14 846 | 11/1991 | Germany | B06B 1/06 |
| 1 168 430 | 6/1983 | Russian Federation | B29C 65/08 |
| 1 071 616 | 6/1967 | United Kingdom | H04R 17/00 |
| 1 331 100 | 9/1973 | United Kingdom | B08B 3/10 |

OTHER PUBLICATIONS

PCT Search Report, SE 95/00607, Feb. 28, 1996.

*Primary Examiner*—Thomas M. Dougherty
*Attorney, Agent, or Firm*—Burns, Doane, Swecker & Mathis, L.L.P.

[57] ABSTRACT

The invention relates to an arrangement in a drive unit (2) for an ultrasound sealing unit (1). The drive unit (2) is of the type which has a number of piezoelectric ceramic plates (7) disposed with interjacent, conductive metal sheets (8) coupled to an a.c. source. The ceramic plates (7) and the metal sheets (8) are held together with a counterweight (9) by a clamping screw (10) which partly secures the drive unit (2) to the ultrasound sealing unit (1), and partly realises a clamping force on the drive unit (2). The counterweight (9) has an inner and an outer diameter. In order to obtain a uniform pressure loading on the ceramic plates (7), a groove (12) is provided in the inner diameter of the counterweight (9).

10 Claims, 1 Drawing Sheet

ARRANGEMENT IN A DRIVE UNIT FOR AN ULTRASOUND SEALING UNIT

TECHNICAL FIELD

The present invention relates to an arrangement in a drive unit for an ultrasound sealing unit, the drive unit being of the type which consists of a number of piezoelectric ceramic plates which are disposed with interjacent, conductive metal sheets, electrically coupled to an a.c. source, a counterweight with an inner and an outer periphery, and a clamping screw.

BACKGROUND ART

A conventional ultrasound sealing unit normally consists of a converter, a booster and a horn. In the converter or transducer, which converts the electric oscillation into mechanical oscillation, some form of drive unit is included, this drive unit being coupled to an a.c. source. The type of ultrasound sealing unit that is described in Swedish Patent Application No. SE 9300918-1 (which is a compact sealing unit) also possesses a drive unit. This type of sealing unit has a central nodal plane which constitutes the anchorage point of the unit, reaction bodies which surround the drive unit, and a horn with an elongate, narrow sealing surface. Such a sealing unit has been particularly designed and produced for use in the limited space which is available in filling machines for filling liquid contents into packages of the single use disposable type.

A common type of drive unit for ultrasound sealing units is that which consists of a number of piezoelectric ceramic plates which sandwich between them conductive metal sheets coupled to an a.c. source. The ceramic plates are secured to the sealing unit by means of a clamping screw which also clamps a counterweight in place.

Given that the clamping force which is normally applied to both counterweight and ceramic plates is relatively high, normally of the order of 25 MPa or more, this results in even a relatively thick counterweight being deformed so much that the load distribution on the piezoelectric ceramic plates becomes distorted. The thickness of the counterweight is normally less than half of its diameter. Naturally, a thicker counterweight is subject to less deformation and would then give a more uniform load distribution on the ceramic plates. But it is a disadvantage to employ an excessively thick counterweight, since this in turn gives as a consequence that the ceramic plates must be fewer in number or thinner in dimensions. The uneven load distribution gives rise to extreme, unfavourable loading on the ceramic plates. The ceramic plates are brittle and highly sensitive to any form of tensile or flexural stress.

One method of obtaining a somewhat more uniform load distribution on the ceramic plates is to employ a horizontally divided counterweight. However, the inherent disadvantage is that each part of the counterweight will be considerably thinner. This in turn leads to greater elasticity in each part and, as a result, totally uniform load distribution can never be achieved because of the inevitable deformation. In addition, a divided counterweight is more difficult and more expensive to manufacture. The greater degree of elasticity may also give rise to the generation of noise in the contact surfaces. Furthermore, a quantifiably higher loss of energy has been demonstrated for divided counterweights.

OBJECTS OF THE INVENTION

One object of the present invention is to realise a drive unit with a counterweight which distributes the loading when the sealing unit is in operation in as uniform a manner as possible, throughout the entire surface of the piezoelectric ceramic plates.

A further object of the present invention is to be able to manufacture a counterweight for a drive unit which does not suffer from the drawbacks inherent in a divided counterweight.

SOLUTION

These and other objects have been attained according to the present invention in that the arrangement of the type disclosed by way of introduction has been given the characterizing feature that a groove is provided in the inner periphery of the counterweight for the purpose of levelling out the clamping load.

BRIEF DESCRIPTION OF THE ACCOMPANYING DRAWINGS

One preferred embodiment of the present invention will now be described in greater detail hereinbelow, with particular reference to the accompanying Drawings, in which.

DESCRIPTION OF PREFERRED EMBODIMENT

Figure 1:
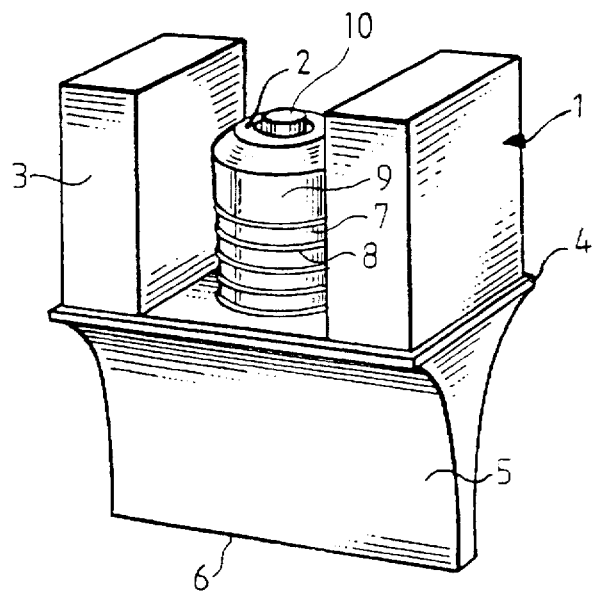
FIG. 1 is a schematic illustration of an ultrasound sealing unit.

Every type of ultrasound sealing unit 1 must have a drive unit 2, like, for example, the sealing unit 1 illustrated in FIG. 1. The sealing unit 1 in FIG. 1 has been specifically produced to be housed in the limited space available in those filling machines which pack liquid foods into packages of the single use disposable type, and the total length of the sealing unit 1 consists of but one half of a wave length. In addition to the drive unit 2, the sealing unit 1 has reaction bodies 3 which surround the drive unit 2, a centrally placed nodal plane 4 in which the sealing unit may be fixed, and a horn 5 with an elongate, narrow sealing surface 6. The arrangement according to the present invention may naturally be employed for drive units 2 for conventional ultrasound sealing units 1 of the type which consists of a converter, a booster and a horn.

The drive unit 2 of the sealing unit 1 which is connected to an a.c. source (not shown) converts the electric potential into mechanical displacement which gives rise to the oscillation which constitutes the sealing work of the unit 1. The drive unit 2 consists of a number of piezoelectric ceramic plates 7 with an outer and an inner periphery. Between the piezoelectric ceramic plates 7 there are provided conductive metal sheets 8, preferably manufactured from nickel or beryllium bronze. The metal sheets 8 are connected to an a.c. source (not shown) so that the piezoelectric ceramic plates 7 are electrically connected in parallel.

The piezoelectric ceramic plates 7 withstand extreme compression stresses, but they are brittle and sensitive to tensile and flexural stresses. Consequently, while the ultrasound sealing unit 1 is in operation, the piezoelectric ceramic plates 7 must be under pressure loading, which is realised by a clamping force which is higher than the highest amplitude generated by the drive unit 2. This clamping force is achieved by a counterweight 9 and a clamping screw 10.

The counterweight 9 which consists of a metal plate with an outer and inner periphery is manufactured from a material which should be as rigid as possible, for example steel. The counterweight 9 is employed partly to distribute the clamping force over the piezoelectric ceramic plates 7 and partly as a reaction mass to obtain the specific resonance frequency which it is intended that the drive unit 2 is to excite. The clamping screw 10 holds together the counterweight 9, the ceramic plates 7 and metal sheets 8 to a unit under a certain clamping force, and also secures the drive unit 2 in the sealing unit 1.

Figure 2:
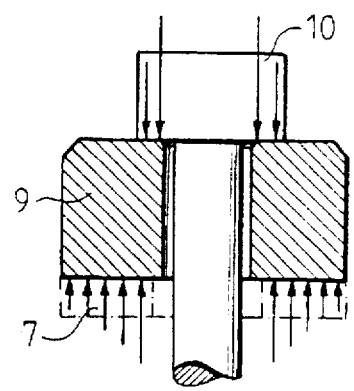
FIG. 2 shows the load distribution of a conventional drive unit.

It is desirable that the clamping force which is applied on the ceramic plates 7 be as uniformly distributed as possible, given that the ceramic plates 7 are sensitive to uneven loading. However, measurements have shown that a conventional counterweight, as in FIG. 2, is deformed by the high clamping force, normally of the order of magnitude of 25 MPa or more, so that a higher compression loading is obtained at the inner periphery of the counterweight 9 than at its outer periphery. It is particularly unfortunate to have the maximum loading at the edge of the ceramic plates 7, since the ceramics are extremely brittle. This problem has been solved to some degree by employing a divided counterweight 9 which gives a slightly more uniform load distribution. However, as a result of a divided counterweight, the counterweight itself 9 will be thinner and thereby more elastic. As a result, wholly uniform load distribution cannot be achieved because of the inevitable deformation of the parts of the counterweight. Because of the increased elasticity, noise may moreover be generated in the contact surfaces of the thin parts of the divided counterweight 9. In addition, a divided counterweight 9 gives quantifiable energy losses.

Figure 3:
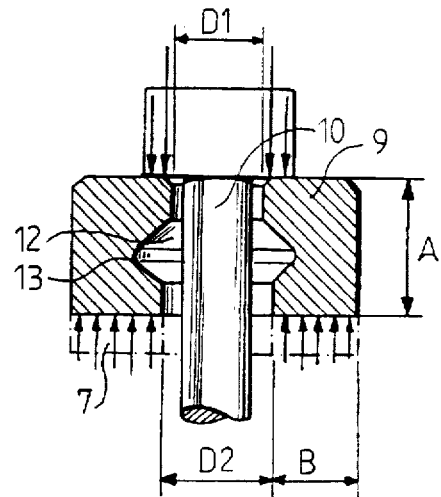
FIG. 3 shows the load distribution of a drive unit according to the present invention.
Figure 4:
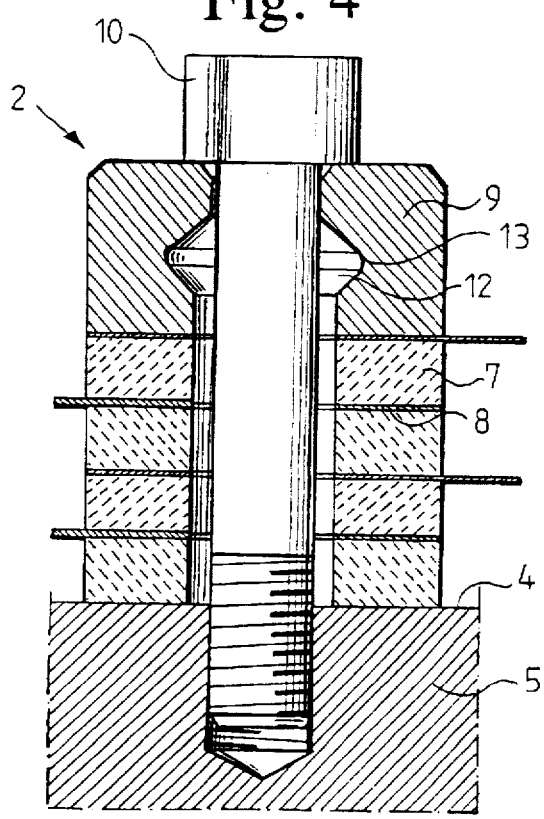
FIG. 4 shows a drive unit according to the present invention.

The intention is to achieve a distribution of the clamping load as shown in FIG. 3. This is achieved according to the present invention by, as shown in FIGS. 3 and 4, providing grooves 12 in the inner periphery of the counterweight 9. By providing grooves 12 in the inner periphery of the counterweight 9, the force lines which follow the material in the counterweight 9 are urged out towards the outer periphery and a clamping load which is distributed uniformly over the entire surface of the ceramic plates 7 will thus be obtained even when the thickness of the counterweight is less than half of its diameter.

The groove 12 runs around the entire inner periphery of the counterweight 9 and should be centrally placed in the counterweight 9. The groove 12 may be straight, U- or V-shaped. The groove 12 should further have a gentle radius 13, i.e. as large a radius 13 as possible. In the preferred embodiment, the groove 12 is V-shaped. Smaller radii 13 or straight corners may give rise to fatigue cracks in the material of the counterweight 9. The groove 12 should, in its major extent, constitute 20–80 percent of the thickness A of the counterweight 9. In the preferred embodiment, the groove 12 constitutes 40–50 percent of the thickness A of the counterweight 9. The depth of the groove 12 is between 15 and 40 percent of the material thickness B of the counterweight 9 between the inner and outer peripheries; in the preferred embodiment the depth of the groove 12 is between 20 and 30 percent of the material thickness B of the counterweight 9. As shown in FIGS. 3 and 4, the counterweight 9 may have different diameters. In the upper portion of the counterweight 9, the inner diameter D1 is determined by the diameter of the clamping screw 10 and, in the lower portion of the counterweight 9, the inner diameter D2 is determined by the inner diameter of the ceramic plates 7. Diameter D2 should be the same as the inner diameter of the ceramic plates 7.

As will have been apparent from the foregoing description, the present invention realises an arrangement in a drive unit 2 for an ultrasound sealing unit 1 which affords a more uniform load distribution of the clamping load on the ceramic plates 7. This arrangement results in a drive unit 2 which is more efficient than conventional drive units 2 and the arrangement also gives the drive unit 2 longer service life.

The present invention should not be considered as restricted to that described above and shown on the Drawings, many modifications being conceivable without departing from the spirit and scope of the appended Claims.

What is claimed is:

1. An ultrasound sealing unit, comprising:
    a horn having at one end a sealing surface for producing a seal during operation of the sealing unit; and
    a drive unit operatively mounted with respect to the horn to convert electrical potential into mechanical displacement to produce oscillation, the drive unit including a plurality of piezoelectric ceramic plates arranged in a stack, conductive metal sheets disposed between the piezoelectric ceramic plates for being connected to an a.c. source, a counterweight disposed at an end of the stack of ceramic plates opposite the horn, and a clamping screw which clamps together the counterweight, the piezoelectric ceramic plates and the conductive metal sheets, the clamping screw producing a clamping load on the ceramic plates, the counterweight having an inner periphery, the inner periphery of the counterweight being provided with a groove to produce a substantially uniform load distribution of the clamping load on the ceramic plates.

2. An ultrasound sealing unit according to claim 1, wherein said groove is V-shaped.

3. An ultrasound sealing unit according to claim 2, wherein said groove is centrally located in the inner periphery of the counterweight with respect to an axial extent of the counterweight.

4. An ultrasound sealing unit according to claim 1, wherein said counterweight has an axial thickness in an axial direction, said groove at its major extent constituting between 20 percent and 80 percent of the axial thickness of the counterweight.

5. An ultrasound sealing unit according to claim 1, wherein said counterweight has a radial thickness in a radial direction, said groove constituting between 15 percent and 40 percent of the radial thickness of the counterweight.

6. An ultrasound sealing unit, comprising:
    a horn having a sealing surface at one end for producing a seal during operation of the sealing unit;
    a drive unit mounted on an end of the horn opposite said one end for converting electrical potential into mechanical displacement to produce oscillation, the drive unit including a plurality of piezoelectric ceramic plates arranged in a stack, conductive metal sheets disposed between the piezoelectric ceramic plates for being connected to an a.c. source, a counterweight disposed at an end of the stock of piezoelectric ceramic plates opposite the horn, and a clamping screw which clamps together the counterweight, the piezoelectric ceramic plates and the conductive metal sheets, the clamping screw producing a clamping load on the piezoelectric ceramic plates, the counterweight having an inner periphery defining a hole through which the clamping screw extends, the inner periphery of the counterweight being provided with a groove located centrally with respect to an axial extent of the counterweight to produce a substantially uniform load distribution of the clamping load on the ceramic plates.

7. An ultrasonic sealing unit according to claim 6, wherein said sealing surface is long and narrow to produce a long and narrow seal.

8. An ultrasound sealing unit according to claim 6, wherein said groove is V-shaped.

9. An ultrasound sealing unit according to claim 6, wherein said counterweight has an axial thickness in an axial direction, said groove at its major extent constituting between 20 percent and 80 percent of the axial thickness of the counterweight.

10. An ultrasound sealing unit according to claim 6, wherein said counterweight has a radial thickness in a radial direction, said groove constituting between 15 percent and 40 percent of the radial thickness of the counterweight.

* * * * *